(12) United States Patent
van der Meer

(10) Patent No.: US 10,905,528 B2
(45) Date of Patent: Feb. 2, 2021

(54) SYSTEM AND METHOD FOR REGISTERING IMPLANT ORIENTATION DIRECTLY FROM A DENTAL IMPRESSION

(71) Applicant: Global Dental Science, LLC, Scottsdale, AZ (US)

(72) Inventor: Robert van der Meer, Rotterdam (NL)

(73) Assignee: Global Dental Science, LLC, Scottsdale, AZ (US)

( * ) Notice: Subject to any disclaimer, the term of this patent is extended or adjusted under 35 U.S.C. 154(b) by 0 days.

(21) Appl. No.: 15/711,857

(22) Filed: Sep. 21, 2017

(65) Prior Publication Data

US 2019/0083205 A1    Mar. 21, 2019

Related U.S. Application Data

(60) Provisional application No. 62/397,888, filed on Sep. 21, 2016.

(51) Int. Cl.
*A61C 8/00* (2006.01)
*A61C 9/00* (2006.01)

(52) U.S. Cl.
CPC .......... *A61C 8/0001* (2013.01); *A61C 9/0006* (2013.01); *A61C 9/0053* (2013.01)

(58) Field of Classification Search
CPC ............................ A61C 8/0001; A61C 9/0006
USPC ......................................................... 433/173
See application file for complete search history.

(56) References Cited

U.S. PATENT DOCUMENTS

| 8,100,692 | B2 * | 1/2012 | Diangelo ............. A61C 8/0001 |
| | | | 433/213 |
| 9,717,570 | B2 * | 8/2017 | Chung ................. A61C 8/0001 |
| 9,775,688 | B2 * | 10/2017 | Herweg ............... A61C 8/0001 |
| 10,022,916 | B2 * | 7/2018 | Powell ..................... A61C 8/00 |
| 10,159,545 | B2 * | 12/2018 | Thome ................. A61C 8/0016 |
| 2009/0220916 | A1 * | 9/2009 | Fisker ...................... A61C 9/00 |
| | | | 433/201.1 |
| 2013/0101962 | A1 | 4/2013 | Howe |
| 2013/0216323 | A1 | 8/2013 | Matthias et al. |
| 2015/0064653 | A1 | 3/2015 | Grobbee et al. |

(Continued)

FOREIGN PATENT DOCUMENTS

| DE | 102006023673 | 11/2007 |
| EP | 1798459 | 6/2007 |

(Continued)

OTHER PUBLICATIONS

EP Application 18161215—EP Search Report dated Jun. 5, 2018.
EP Application 18189345—EP Search Report dated Jan. 16, 2019.
EP Application 17192480—EP Search Report dated Apr. 11, 2018.

*Primary Examiner* — Matthew M Nelson
(74) *Attorney, Agent, or Firm* — Derrick Harvey; Harvey Law, PC

(57) ABSTRACT

The present invention comprises a uniquely-shaped implant position transfer body used during the acquisition of dental impressions of the intra oral cavity of patients receiving artificial tooth replacement. The present invention further comprises one-piece scan bodies used during 3D-scanning of these dental impressions. The present invention even further comprises a method of the registration of implant position (coordinates) and/or orientation (direction vectors) within and from a dental impression.

16 Claims, 6 Drawing Sheets

(56) References Cited

U.S. PATENT DOCUMENTS

2015/0251359 A1\* 9/2015 Powell .................... A61C 8/00
   700/98
2016/0317263 A9 11/2016 Morales et al.
2019/0053881 A1 2/2019 Grobbee et al.

FOREIGN PATENT DOCUMENTS

| EP | 2403427 | 1/2012 |
| EP | 3216420 | 9/2017 |
| EP | 3284438 | 2/2018 |
| WO | WO2010094922 | 8/2010 |

\* cited by examiner

SYSTEM AND METHOD FOR REGISTERING IMPLANT ORIENTATION DIRECTLY FROM A DENTAL IMPRESSION

RELATED APPLICATIONS

This application claims priority from U.S. Provisional Application No. 62/397,888 filed on Sep. 21, 2016 and entitled "Implant Position Transfer Body and Universal, One-Piece, Scan Body to Register Implant Orientation Directly from a Dental Impression," the entire contents of which are hereby fully incorporated herein.

FIELD OF INVENTION

The present invention relates to uniquely-shaped implant position transfer bodies used during the acquisition of dental impressions of the intra oral cavity of patients receiving artificial tooth replacement. The present invention further relates to one-piece scan bodies used during 3D-scanning of these dental impressions. More particularly, the present invention relates a method of the registration of implant position (coordinates) and/or orientation (direction vectors) within and from a dental impression.

BACKGROUND OF THE INVENTION

In the field of Cad/Cam manufacturing for dental prosthetic construction upon implants, one of the first tasks in the process involves creating one or more data sets of available information so that by means of 3D-scanning, gathering object data that includes gingiva contours, natural teeth elements and implant positions and orientation. The scanned object often is a stone or plastic model that includes implant replicas affixed to mimic the patient's intra oral anatomy. Other methods for 3D-scanning may involve other intra-oral scan procedure. Still other methods for 3D-scanning may involve the dental impressions in which transfer bodies are enclosed to which manufacturer-specific scan bodies are attached or screwed manually before scanning, as is described in application US2009/0220916.

SUMMARY OF THE INVENTION

In accordance with various aspects of the present invention, a universal, one-piece scan body is developed that may fit into the cavity in the dental impression. The cavity may be created by an identically shaped positive part, hereby referenced as an implant position transfer. The implant position transfer may be placed onto the implants before taking the impression. After taking the impression and creating cavities from the implant position transfer, the scan body may be placed into its unique position in the cavity. According to embodiments in the figures, the scan body is shown as being integral, or one piece. With the scan body in place, the impression may be scanned and the resulting dataset may be used to translate the exact position and orientation of the implants in relation to the gingiva, jaw, teeth of the patient, and other anatomical landmarks of the patient. In an embodiment of the invention, a system for registering implant orientation directly from a dental impression for acquiring data by imaging the dental impression, the system comprising an implant position transfer body, said implant position transfer body compromising an implant side to mate with a dental implant affixed in a patient's jawbone, an impression side having a terminus structure at its end, whereby when the transfer body is mated atop the dental implant, the impression side may applied in a dental impression material, that when hardens, creates a defined cavity in a dental impression, a scan body having a first end extending to a second end, the second end of the scan body having the same structure as the impression side of the implant position transfer body, so that the scan body may securely fit into the dental impression, whereby the position and orientation of the implant may be acquired by scanning the dental impression having the scan body. In another embodiment of the invention, a method is disclosed for registering dental implant orientation directly from a dental impression of a patient's jaw ridge that includes at least one implant, for the purpose of acquiring data by imaging the dental impression, the method comprising the following steps:

1) Securing an implant transfer body to a dental implant affixed in a dental patient's jaw, the implant transfer body having a terminus structure at its end opposite of that which is secured to the dental implant;

2) Taking an impression of the patient's jaw, so that a negative mold of the terminus structure is created in the impression;

3) Inserting a scan body having a terminus structure at a first end into the negative mold of the impression, with the terminus structure releasably securing at an innermost portion of the impression; and 4) Acquiring 3D data from the impression having the scan body releasably secured in the negative mold, whereby the 3D data may indicate the position and orientation of the implant for the purposes of designing dental prosthetics.

BRIEF DESCRIPTION OF THE DRAWINGS

A more complete understanding of the present invention may be derived by referring to the detailed description and claims when considered with the figures, where like reference numbers refer to similar elements throughout the figures, and:

DETAILED DESCRIPTION OF EXEMPLARY EMBODIMENTS OF THE INVENTION

The present invention may be described herein in terms of various components. It should be appreciated that such components may be realized by any number of structural materials and components configured to perform the specified functions. For example, the present invention may be practiced in any number of dental contexts and the exemplary embodiments relating "Implant position transfer bodies and universal, one-piece, scan bodies to register implant orientation directly from a dental impression" are merely a few of the exemplary applications for the invention. For example, the principles, features and methods discussed herein may be applied to any method of impression taking and to any dental restoration or dental treatment.

In accordance with various aspects of the present embodiment of the invention, implant position transfer bodies and universal, one-piece, scan bodies are provided to register implant orientation by using a 3D-scanning procedure or other technique to acquire image data directly from a dental impression.

Figure 1:
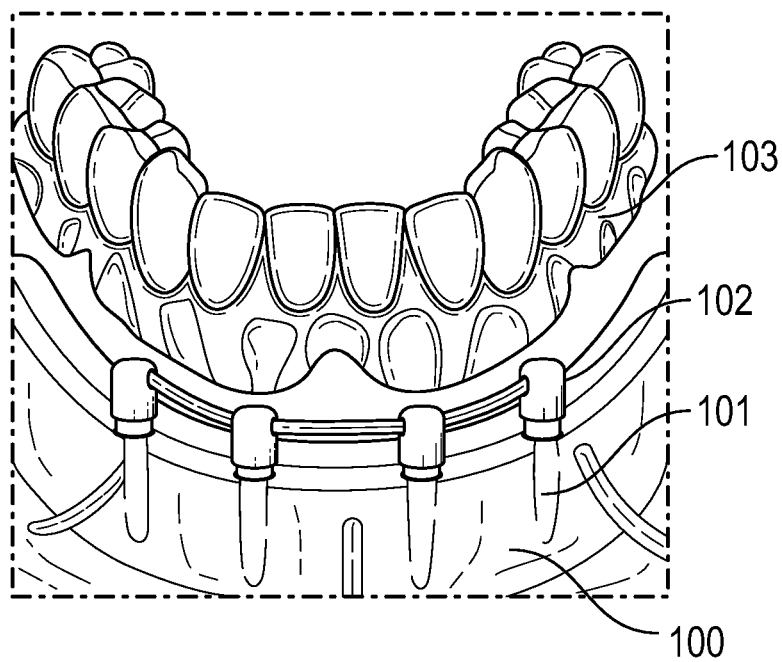
FIG. 1. is a front perspective view of a edentulous jaw with multiple implants fixed into the jaw bone to carry an abutment as a basis for a fixed- or removable dental restoration.

Looking at FIG. 1, a patient's edentulous jaw and gingiva 100 may comprise multiple implants 101 that may be fixed into the jaw bone and intended to carry an abutment 102 as a basis for a fixed- or removable dental restoration 103. Though this embodiment focuses upon a fill arch replacement upon four (4) implants, other prosthetic solutions are well within the scope of invention.

Figure 2:
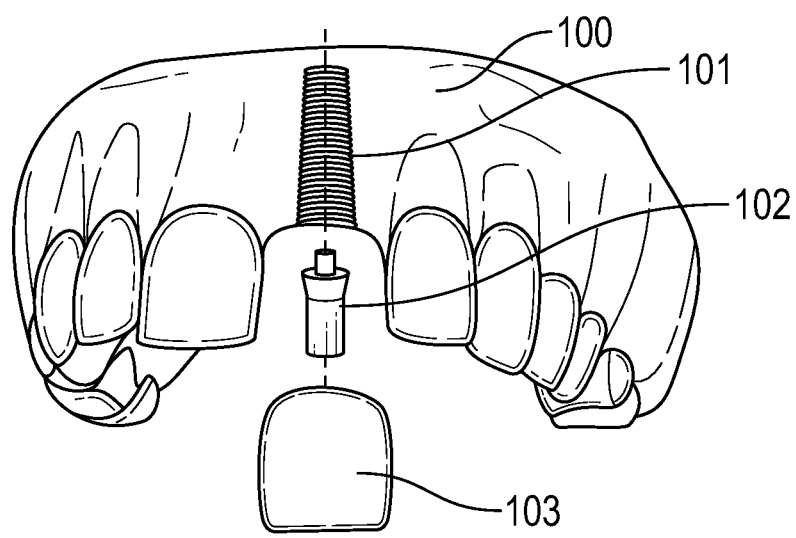
FIG. 2. is a perspective view of a jaw with an implant fixed into the jaw bone and intended to carry an abutment as a basis for a fixed- or removable dental restoration.

For example, an embodiment depicting a single tooth prosthetic may be viewed in FIG. 2. The upper arch having an implant 101 fixed into the jaw bone is intended to carry an abutment 102 as a basis for a fixed- or removable dental restoration 102.

Figure 3A:
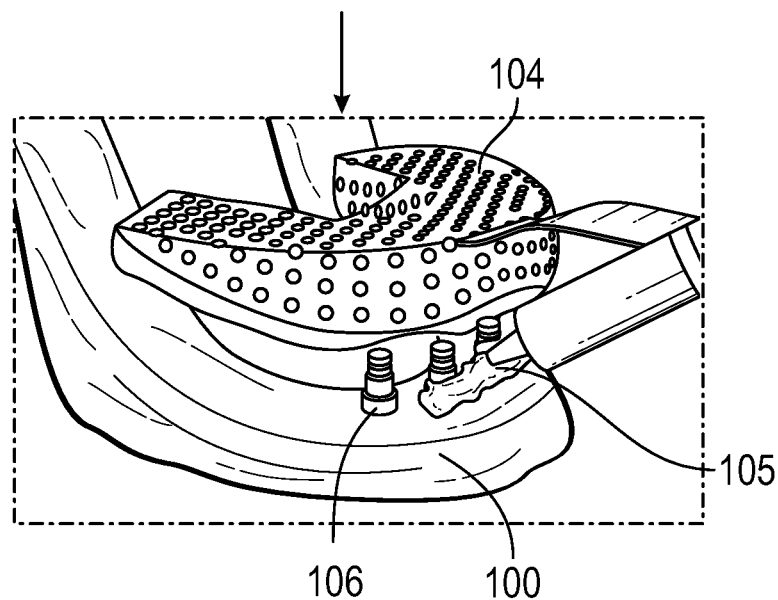
FIG. 3a shows a side perspective view of the closed-tray impression taking process utilizing the inventive system.
Figure 3B:
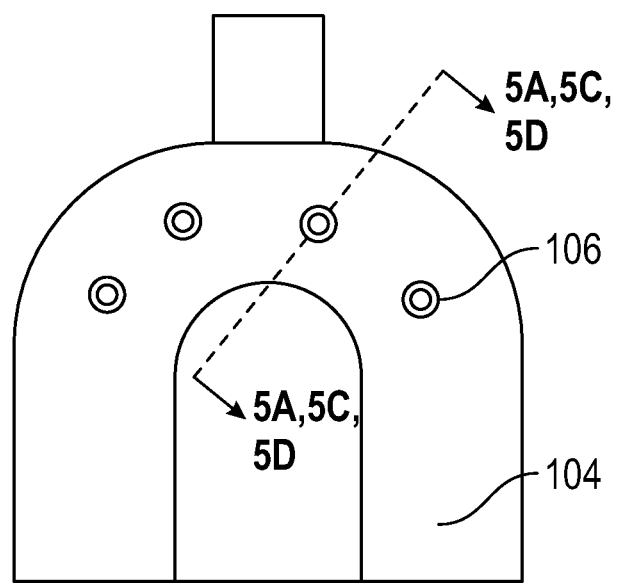
FIG. 3b shows a view of the impression tray, with a cross section indicated by a-a.

Regardless of the number of implants deployed to support a prosthetic solution, an embodiment of the invention may address FIG. 3 shows an overview of the closed-tray impression taking process, where a tray 104 may be filled with putty 105 and placed onto possible remaining teeth, gingiva tissue 100 and onto the implant position transfer bodies 106. After the curing time, the putty is hardened and will contain an impression of the remaining teeth, gingiva tissue and one or multiple cavities caused by the implant position transfer bodies.

Figure 4A:
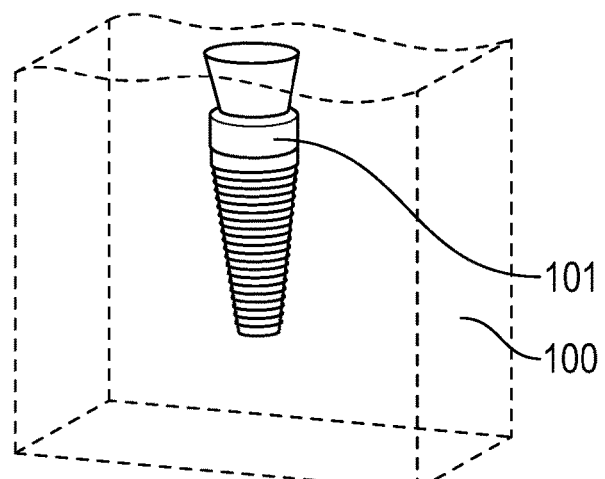
FIGS. 4a-b show the schematic view of gingiva tissue containing an implant, along with an A-A cross section view in FIG. 4b.
Figure 4B:
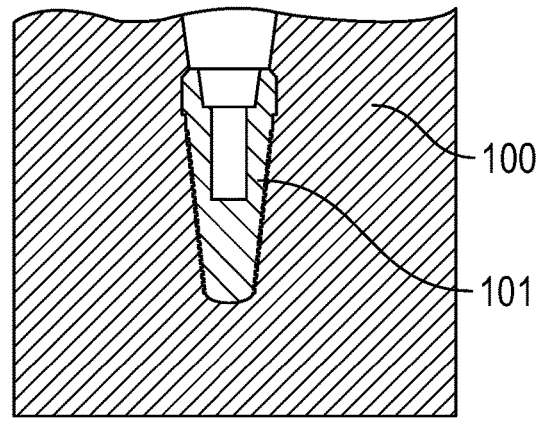

Looking now to FIGS. 4a-b, a closer view of an example of a two piece implant is made, with an abutment emerging above the gingiva.

Figure 5A:
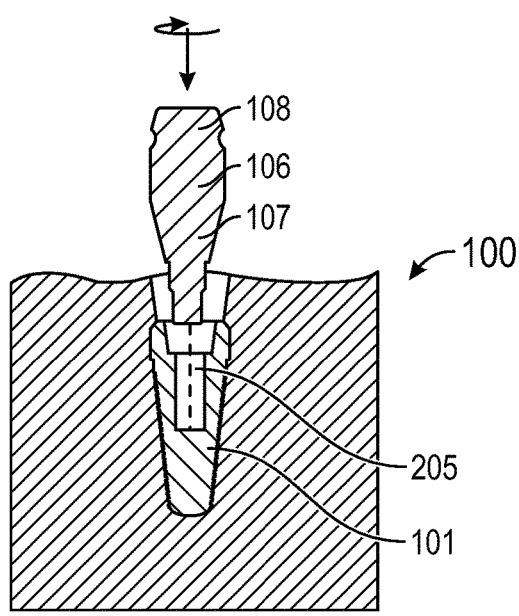
FIG. 5a. shows a schematic view of gingiva tissue containing an implant, with the implant position transfer body shown in disassembled position.
Figure 5B:
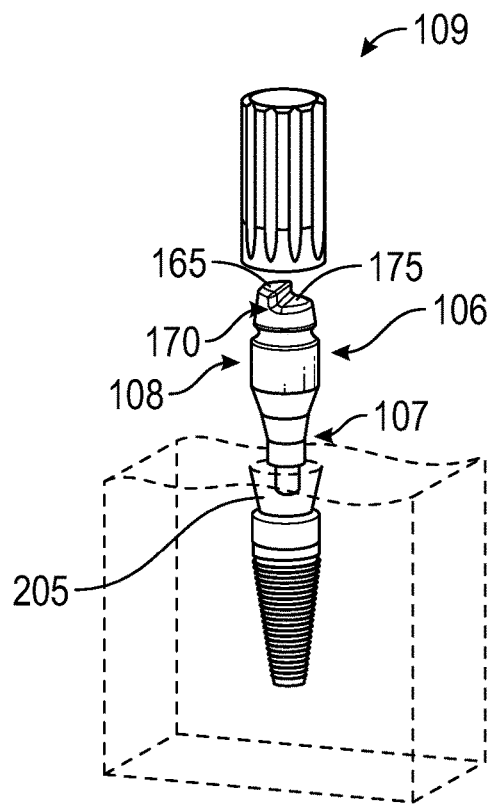
FIG. 5b shows a surface view.

FIG. 5a continues to illustrate the jawbone/gingival tissue 100 and an implant anchor 101. In the embodiment illustrated, an implant position transfer body 105 is shown in a being threaded into the anchor portion of the two-piece implant, the implant position transfer abutment having been removed. The implant position transfer body may comprise an implant side and an impression side. A portion of the implant side 107 may be equipped to fit the implant interface. In FIGS. 5a-b, the portion of the implant side that fits the implant interface may comprise a threaded portion that mates to the internal threads of the implant anchor. In other embodiments of the invention, the implant side of the transfer body may have other structural configurations. The impression side 108 of the transfer body may have a unique shape that, upon transfer and registration to impression material, may create a slight undercut and universal, unique shaped, cavity in the impression material. According to the embodiments in FIGS. 5-7, the impression side may comprise, beginning at point along the transfer body that emerges from the implant anchor and extending towards the terminus of the impression side, a cylindrical portion, an undercut along an annular channel of the transfer body, a tapering portion with a decreasing circumference, and a terminus structure at the end of the impression side. In the embodiment shown, the terminus structure may comprise first face having a perimeter and a shelf, with at least a portion of the perimeter being concentric with other circumferences of the implant transfer body. The shelf may intersect the perimeter of the face and extend to a second face being disposed at distally of the end of the impression side. First and second faces may be perpendicular to the perimeter, or may include a taper/grade. As illustrated in FIG. 9 of the scan body having the same structure at its impression end, the first face may resemble a semi or lesser portion of a circle from an axial point of view at the impression end. In another embodiment of the invention, the shelf between the first and second face may include a groove or bevel into the terminus structure.

In another embodiment of the invention, the impression side may include a feature or shape 111 that engages with a separate driver to find grip during rotation and seating of the transfer body. FIG. 5b shows a driver 109 comprising has a mating pocket 110 that fits the impression side of the implant position transfer. In an embodiment of the invention, the impression side portion may include a screw to lock the transfer body onto the implant. In other embodiments of the invention, the driver may mate with the transfer body through other structures, such as intermediary devices or indirect mating. In such a manner, the driver may enable the transfer body to be mounted onto the implant.

Figure 5C:
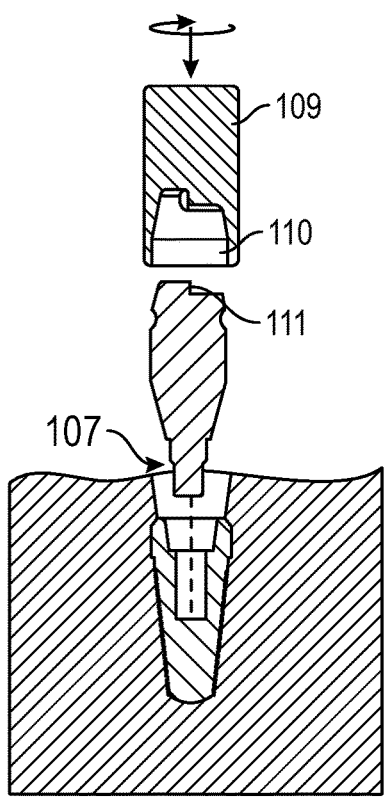
FIG. 5c shows a cross section view of the driver with a mating pocket that fits the coronal portion of the implant position transfer, according to an embodiment of the invention.
Figure 5D:
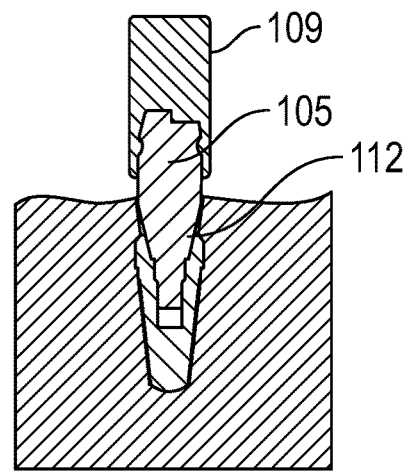
FIG. 5d illustrates a schematic side cross-sectional view that shows the implant position transfer body attached to the implant by means of an internally threaded two piece implant anchor.

Moving to FIG. 5c, the same view of the implant now includes the implant position transfer body attached to the implant by means of a threaded connection 112, the threaded connection being embodied as connecting with an internally threaded two-piece implant anchor. However, other embodiments not shown of the invention and transfer body may include mating with other geometric configurations such as externally-threaded posts or other protruding structures, or other intermediary structures between the implant and transfer body.

Figure 6A:
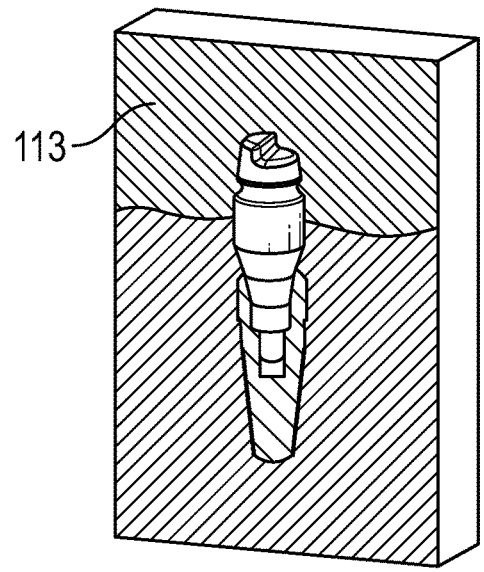
FIG. 6a shows a side perspective view of the impression putty material covering the gingiva contour and implant position transfer body.
Figure 6B:
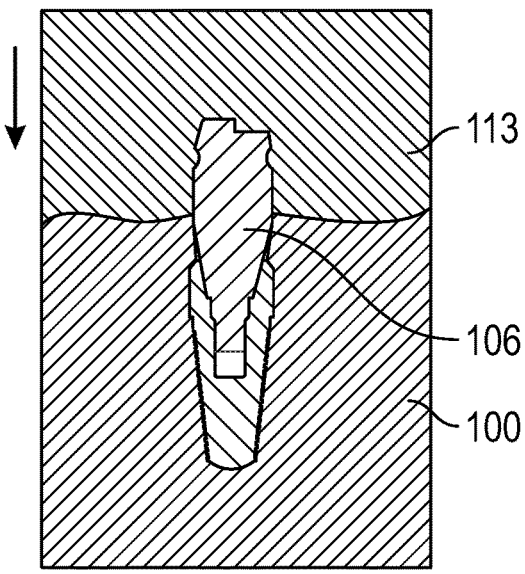
FIG. 6b shows the cross-section thereof.

Looking to FIG. 6, an embodiment of the invention indicates the process step where one may take an impression on the transfer body or bodies. The impression putty material 113 may be applied so that it may cover the gingiva contour 100 and implant position transfer body 106.

Figure 7A:
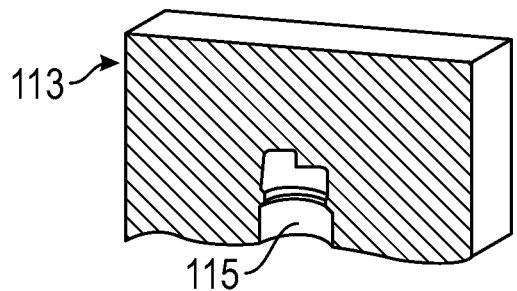
FIG. 7a shows a side perspective view of the impression putty material having been impressed with the inventive structures.
Figure 7B:
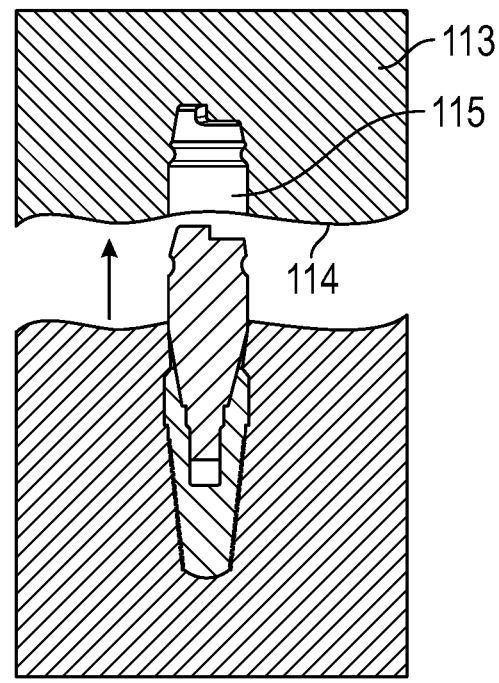
FIG. 7b shows the cross-section thereof.

After removing the impression from the transfer body or bodies, it should register a number of cavities that correlate to each implant transfer body. FIG. 7 shows the impression putty material 113 having been impressed with the inventive structures. This view may assume that impression putty material 113 has hardened, and after the impression putty material 113 has been removed from the intraoral region of the patient. The impression putty material at this point in the process is shown as enclosing the negative shape of the gingiva contour 114 and the negative shape of the implant position transfer body, herein referenced as cavity 115.

Figure 8A:
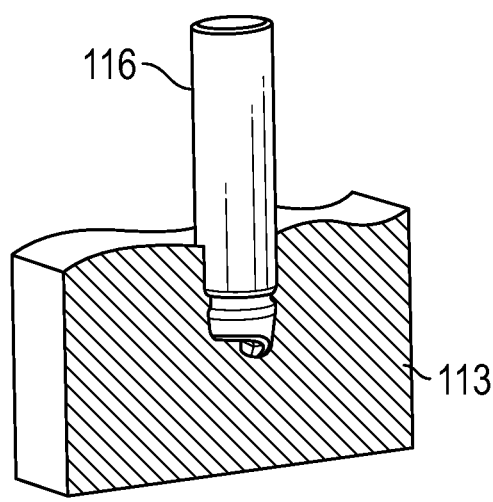
FIG. 8a shows a side perspective view of the impression putty material and the inventive scan body.
Figure 8B:
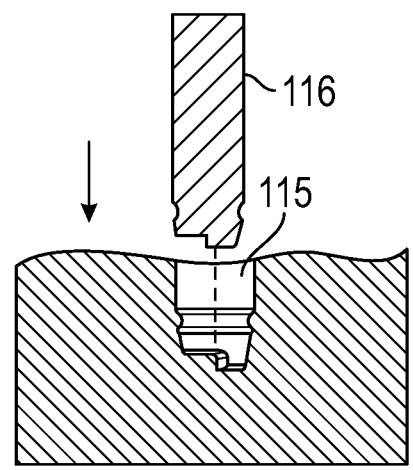
FIG. 8b shows the same view the scan body positioned above cavity in the impression putty.
Figure 9A:
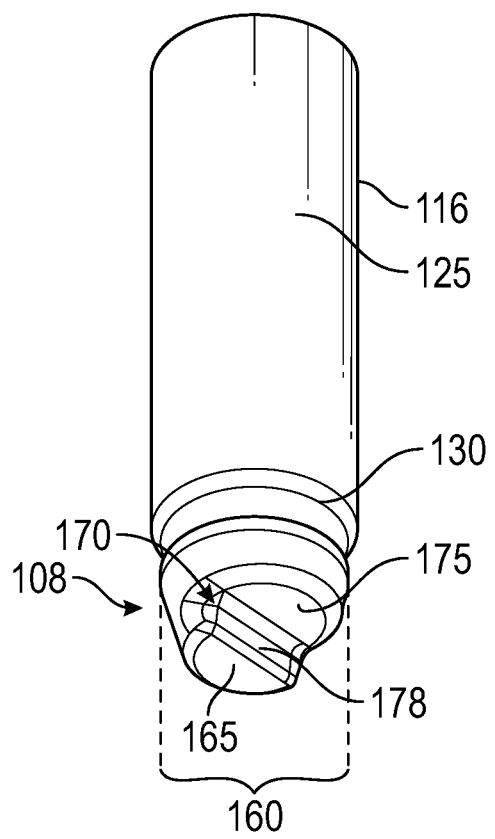
FIG. 9a illustrates a side perspective view of the inventive scan body, according to embodiments of the invention.
Figure 9B:
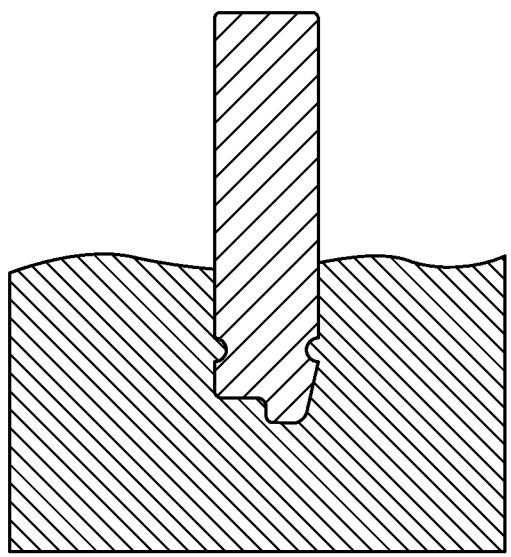
FIG. 9b shows the scan body fully engaged and locked in the impression putty.

In an embodiment of the invention, the scan body may be then mounted into the cavities of the impression putty material. To ensure the scan bodies are mated into the cavities accurately, the undercuts of the scan bodies should match those in the cavity or cavities to ensure a friction fit. FIG. 8. shows the impression putty material and a one-piece scan body 116 that fits into the negatively molded cavity 115 in the impression putty. Scan body 116 may have the same style terminus structure as previously described at the impression side of the implant transfer body. In an embodiment of the invention shown in FIGS. 8-9, the scan body may be a one piece structure, having a first end and a second, the first end extending towards the second end in a cylindrical geometric configuration, then an undercut, and a terminus structure 111 at the second end. In other embodiments, the scan body may have other geometric configurations than a cylindrical shape, and may further comprise more than one piece. In yet another embodiment of the invention, the scan body may comprise the implant transfer body that mates with a first end of the scan body, forming a structure largely similar to that seen in FIGS. 8 and 9. The terminus portion may aid in locking the scan body may be locked into the impression material. In other embodiments of the invention, the translation of the scan body into impression material may be cylindrical, tapered, or have other anti-rotational structures known in the dental arts. FIG. 9a shows a enlarged view of the embodiment of the scan body 116 described above and having a terminus structure at the second end, with the scan body 116 being fit into the cavity 115 of impression putty material in FIG. 9b. In other embodiments of the invention, the exterior of scan body, especially that on the first end, may be optimized for 3 (point plane-2 (line)-1(line) registration to be captured with image acquisition hardware. In still another embodiment, the scan body may comprise optical markers to be captured by an optical 3D scanner.

As described above, it is within the scope of the invention to have multiple scan bodies secured into multiple cavities of the impression material putty. Having the scan bodies disposed in the cavities that relate directly to implant position, the impression is ready for 3D scanning to acquire data for use in planning and designing the prosthetic to be created and seated upon the implants. It is further within the scope to offer a kit that comprises scan bodies, implant transfer bodies and a driver that may be utilized for the inventive system described herein.

The invention claimed is:

1. A system for registering implant orientation directly from a dental impression for acquiring data by imaging the dental impression, the system comprising:
    an implant position transfer body, said implant position transfer body comprising:
        an implant side configured to threadably mate into an internal portion of a dental implant affixed in a patient's jawbone;
        an impression side opposite that of the implant side having a terminus structure at its end, the terminus structure comprising a first face disposed axially at the terminus structure, the terminus structure comprising a first face disposed axially at the terminus structure, the terminus structure further comprising a second face being positioned axially, the second face further disposed between the implant side and the first face, whereby when the transfer body is mated atop the dental implant, the impression side is configured to be applied in a dental impression material that when hardens, may be removed to create a defined cavity in a dental impression;
        a scan body having a first end extending to a second end, the second end of the scan body having the same structure as the impression side of the implant position transfer body, so that the scan body may securely fit into the defined cavity of the dental impression material, the second end of the scan body having a different structural configuration than the implant side of the implant transfer body, whereby the position and orientation of the implant may be acquired by scanning the dental impression having the scan body in the defined cavity of the dental impression.

2. The implant position transfer body of claim 1, the impression side further comprising an annular undercut at the impression side between the terminus structure and the implant end, the annular undercut capable of creating a negative structure within the defined cavity of the dental impression.

3. The implant position transfer body of claim 2, the terminus structure further comprising a shelf that extends between the first face and second face so that the terminus structure resembles a stair step.

4. The system of claim 3, the first face having a lesser surface area than the second face.

5. The system of claim 3, the impression end tapering in circumference between the annular undercut and the second face.

6. The system of claim 3, the shelf extending circumferentially between the first and second face of the scan body.

7. The system of claim 2, the scan body having a cylindrical profile extending from a point at its first end towards the annular undercut at its second end.

8. The system of claim 2, the annular undercut resembling a groove about the scan body.

9. The scan body of claim 1, whereby the first end comprises flat surfaces and thus is optimized for 3 (point plane)-2(line)-1(line) registration to be captured with image acquisition hardware.

10. The scan body of claim 9 further comprising optical markers to be captured by an optical 3D scanner.

11. The scan body of claim 1, the second end further comprising a surface without threads.

12. The system of claim 1 further comprising a driver have an engagement end and a mating end, the mating end comprising cavity that mates with the impression end of the implant position transfer body of claim 1 so that the driver may engage the transfer body.

13. The system of claim 12, whereby the engagement end of the driver comprises a plurality of axially-oriented gripping channels disposed in the surface of the driver.

14. The system of claim 1, the scan body at the second end having a cylindrical shape.

15. The system of claim 1, whereby a number of implant transfer bodies and scan bodies is equal to a number of implants to be impressed in the patient's jawbone.

16. A kit that includes a scan body, an implant transfer body, and a driver as described in claim 12.

* * * * *